(12) United States Patent
Stevenson et al.

(10) Patent No.: US 6,631,030 B2
(45) Date of Patent: Oct. 7, 2003

(54) PROJECTION SCREENS AND METHODS FOR MAKING SUCH PROJECTION SCREENS

(75) Inventors: James A. Stevenson, St. Paul, MN (US); Geoffrey P. Morris, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 82 days.

(21) Appl. No.: 09/823,025

(22) Filed: Mar. 30, 2001

(65) Prior Publication Data

US 2002/0141054 A1 Oct. 3, 2002

(51) Int. Cl.$^7$ .............................................. G03B 21/60
(52) U.S. Cl. ...................................... 359/452; 359/453
(58) Field of Search ................................ 359/452, 453, 359/455, 456, 460; 65/21.1, 21.3

(56) References Cited

U.S. PATENT DOCUMENTS

| | | | |
|---|---|---|---|
| 2,334,578 A | 11/1943 | Potters | 65/21.3 |
| 2,378,252 A | 6/1945 | Staehle et al. | 359/453 |
| 2,794,301 A | 6/1957 | Law et al. | 65/21.3 |
| 3,150,947 A | 9/1964 | Bland | 65/21.2 |
| 3,177,083 A | 4/1965 | de Vries | 106/287.26 |
| 3,712,707 A | 1/1973 | Henkes, Jr. | 359/448 |
| 3,872,032 A | 3/1975 | Kanemaru et al. | 528/401 |
| 4,379,617 A | 4/1983 | Funakashi et al. | 359/453 |
| 4,418,986 A | 12/1983 | Yata et al. | 359/456 |
| 4,443,240 A * | 4/1984 | Shutt et al. | 65/21.1 |
| 4,468,092 A | 8/1984 | Inoue et al. | 359/457 |
| 4,509,823 A | 4/1985 | Moriguchi et al. | 359/457 |
| 4,576,850 A | 3/1986 | Martens | 428/156 |
| 4,961,770 A * | 10/1990 | Johnson et al. | 65/21.3 |
| 4,968,562 A | 11/1990 | Delgado | 428/402 |
| 4,994,332 A | 2/1991 | Coin et al. | 429/27 |
| 5,040,870 A * | 8/1991 | Ohno et al. | 359/443 |
| 5,141,790 A | 8/1992 | Calhoun et al. | 428/40.4 |
| 5,183,597 A | 2/1993 | Lu | 264/1.38 |
| 5,296,277 A | 3/1994 | Wilson et al. | 428/40.2 |
| 5,316,510 A * | 5/1994 | Mühlberger et al. | 209/3 |
| 5,362,516 A | 11/1994 | Wilson et al. | 427/207.1 |
| 5,552,083 A * | 9/1996 | Watanabe et al. | 516/31 |
| 5,563,738 A | 10/1996 | Vance | 359/614 |
| 5,620,775 A * | 4/1997 | LaPerre | 428/149 |
| 5,781,344 A | 7/1998 | Vance | 359/614 |
| 5,849,055 A * | 12/1998 | Arai et al. | 65/21.3 |
| 6,096,159 A | 8/2000 | Ito | 156/344 |
| 6,172,814 B1 | 1/2001 | Watanabe et al. | 359/619 |
| 6,197,397 B1 | 3/2001 | Sher et al. | 428/42.3 |
| 6,204,971 B1 | 3/2001 | Morris et al. | 359/619 |

FOREIGN PATENT DOCUMENTS

| | | |
|---|---|---|
| EP | 0 570 515 B1 | 8/1992 |
| EP | 0 617 708 B1 | 6/1996 |
| WO | WO 97/01610 | 1/1997 |
| WO | WO 98/45753 | 10/1998 |
| WO | WO 99/50710 | 10/1999 |

* cited by examiner

Primary Examiner—Christopher Mahoney
(74) Attorney, Agent, or Firm—Stephen W. Buckingham (57) ABSTRACT

Projection screens and convenient and efficient methods of making such projection screens are provided. Recycled glass is reformed to provide glass microspheres of sufficient quality for use in a projection screen.

15 Claims, 4 Drawing Sheets

PRIOR ART

FIG. 5

PROJECTION SCREENS AND METHODS FOR MAKING SUCH PROJECTION SCREENS

FIELD

This invention relates generally to methods for conveniently and efficiently making a projection screen and more particularly to projection screens constructed according to such methods.

BACKGROUND

Recycled glass is generally glass that has been previously used for a particular purpose and then discarded. Examples include automobile windshields, beverage bottles and windows that have been broken into small pieces. It is known to form recycled glass into low quality microspheres. Recycled glass microspheres are available from Flex O Lite of Muscatine, Iowa, Paris, Texas and St. Thomas, Canada; and Potters of Valley Forge, Pa. Recycled soda lime glass has a refractive index of about 1.5.

Figure 4:
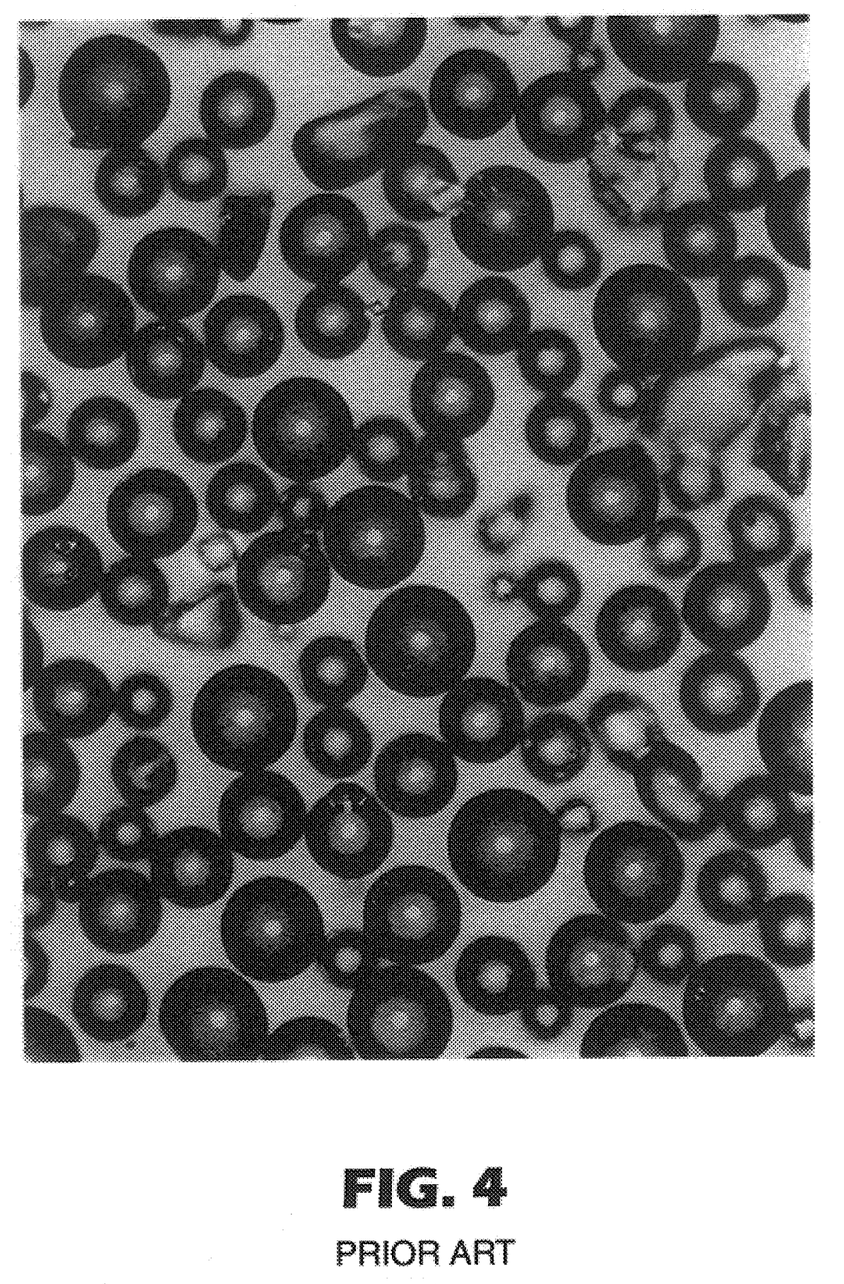
FIG. 4 is a photograph of prior art glass microspheres constructed from recycled glass, which photograph was taken with the aid of a microscope with a magnification of 175X.

FIG. 4 illustrates an example of glass microspheres constructed from recycled glass. Recycled glass microspheres are considered to be lower quality microspheres than similar microspheres generated from substantially pure raw materials. Note the glass has several non-spherical defects. Glass microspheres constructed from recycled glass are typically used as inexpensive filler materials to modify the flow characteristic of a material, or for peening processes, or as an reflective component in a reflective article such as a road marking product. When used in these processes, a large number of defects (e.g., cullet, opaque particles and bubbles) may be tolerated. Glass microspheres constructed from recycled glass are available in a wide range of sizes. The standard deviation of the size of such recycled glass spheres is typically quite large.

A rear projection screen is a sheet-like optical device having a relatively thin viewing layer that is placed at an image surface of an optical projection apparatus. Such a screen makes visible a real image focused by a projection apparatus onto the image surface. The viewing layer is typically planar corresponding to the image surfaces produced by a projection apparatus. Other shapes are possible if the image surface of the projection apparatus is not planar. The screen is intended to act as a filter to attenuate, block, or diffuse light which is not part of the projected image, and to transmit from its rear side to its front side that light which is part of the projected image. In this way it enables the viewer to see the projected image when looking at the front side of the screen.

Front projection systems are also known in the art. They comprise a projector designed to project an image on a surface (e.g., the wall of a conference room or a screen). Overhead projectors are an example of a front projection system. Front projection systems have less capacity to absorb ambient light than rear projection systems.

A well-known type of rear projection screen is a thin, light diffusing layer such as a frosted or translucent glass surface, which may be produced by etching, sandblasting, or otherwise roughening a smooth glass surface. The translucent surface limits the visibility of objects behind the screen. The screen must, however, be sufficiently light transmissive to allow the projected image, which is focused precisely on the translucent surface, to be viewed from the front side of the screen. Since the translucent surface scatters light, the image is viewable from a range of viewing angles. Screens that are merely translucent suffer, however, from a tendency to strongly reflect ambient light incident on the front side, thereby causing fading, or washout, of the projected image. This problem is particularly severe if the background or ambient light is bright.

An approach to reducing the effects of ambient light while still maintaining an acceptable level of projected image light is to attach an array of closely packed glass microspheres (i.e., beads) to a substrate by an opaque polymeric binder. The glass microspheres and substrate are both light transmissible (e.g., transparent). The glass microspheres act as lenses to collect projected light from the rear of the screen and focus it to relatively small spots, near the surfaces of the microspheres. The foci are approximately in the areas where the microspheres contact the front support layer.

Because the transparent microspheres contact the front of the substrate, they exclude most of the opaque binder material from the space between the microspheres and their contact areas on the substrate. This forms an optical aperture between each microsphere and the substrate. The area surrounding each optical aperture is opaque, and preferably black, due to the opaque binder material in the microsphere interstices. As a result, ambient light incident in these areas is absorbed. Thus the front side of the screen appears black, except for the light transmitted through the microspheres.

U.S. Pat. No. 2,378,252 (Staehle) describes projection screen displays, such as rear projection screen displays, based on glass microspheres embedded in an opaque matrix. These types of screens have been growing in popularity for various uses, such as in large format televisions. Rear projection screens with glass beads are also disclosed in U.S. Pat. Nos. 5,563,738 and 5,781,344. Additional beaded screens and methods of making such screens are disclosed in commonly assigned patent application PCT WO 99/50710.

The appearance of such screens is highly sensitive to the quality and placement of the glass microspheres used. Excessive amounts of microspheres that are of incorrect size, are not spherical, or are broken, nicked, scratched, or otherwise defective can create a variety of visible defects, variously called graininess, scintillation, sparkles, speckle, punch through, or simply spots. For example, U.S. Pat. No. 5,563,738 (Vance) states that it is "necessary to eliminate out-of-round, wrong-sized, and discolored microspheres" in order to obtain a uniform appearance.

PCT WO 98/45753 states that glass bead rear projection screens suffer from limitations, especially when they are used to project high quality images that are to be viewed from short distances. The appearance of such screens is highly sensitive to the quality and placement of the glass beads used. Beads that are of incorrect size, are not spherical, or are broken, nicked, scratched or otherwise defective can create a variety of visible defects, variously called graininess, sparkles, punch through or simply spots. These defects are particularly troubling when the screen is used, for example, as a computer monitor, where the need to see a high level of detail is likely to lead the user to scrutinize the screen closely, from a short distance, for long periods of time.

Sparkle is of particular concern for a rear projection system. Sparkle in a rear projection screen is a random pattern of bright points of light that change with the position of the viewer and results from defective beads.

U.S. Pat. No. 6,172,814 (Wantanabe et al.) discloses a rear projection screen having a plurality of glass minute transparent balls. Wantanabe et al. discloses several embodiments. In those embodiments, glass minute transparent balls having a refractive index of n=1.5, n=1.6, n=1.7, n=1.8, n=1.9 and n=2.1 are disclosed. Wantanabe et al. stated that glass minute transparent balls having a refractive index of n=1.5, n=1.9 and n=2.1 were mass produced, generally available and at low cost. Wantanabe et al. also stated that glass minute transparent balls having refractive indexes of n=1.6, n=1.7 and n=1.8 are comparatively expensive.

U.S. Pat. No. 6,204,971 (Morris et al.) discloses glass microspheres for use in rear projection screen displays and methods of making such microspheres. In a preferred embodiment, Morris et al. tolerates low levels (e.g., less than 15%) of defects. In a preferred embodiment, the defect level was measured by counting the microspheres and the respective defects of a microsphere sample under an optical microscope. The percent defects referred to the total number of microspheres that contained bubbles, possessed odd shapes, were opaque or formed cullet.

A number of processes have been devised for the production of spherical glass bodies in small sizes. These generally involve the special melting of glasses with the desired refractive index, converting the glass into particles and the subsequent free suspension of the particles in a hot zone for a time and at a temperature sufficient to permit each particle to be drawn into a spherical shape by surface tension. Examples of glass bead processing are found in U.S. Pat. Nos. 2,794,301 and 3,150,947.

SUMMARY

The present invention provides methods of convenient and efficiently producing glass microspheres for use in projection screens, such as a monolayer rear projection screen. It has been determined that certain defects in a rear projection screen arise, to a large degree, by certain glass bead defects. Elimination or a substantial reduction in those certain defects results in a surprisingly high quality projection screen without the need to engage in additional, expensive processing steps to eliminate the many potential glass bead defects. For example, it has been determined that there is a strong correlation between glass beads with facets and projection screens that exhibit a sparkle defect.

Facets are flat areas that are found in cullet, broken microspheres, cracked microspheres and the interface between duplexes. While sparkle can be caused by almost any bead imperfection, other bead imperfections tend to have a lesser surface area or are rounded and, as a result, tend not to be as objectionable to a viewer of the rear projection screen.

Reprocessing recycled glass beads sufficient to reduce the number of facets reduces the need to engage in additional bead reprocessing specifically designed to reduce other defects such as bubbles, duplexes or opaque particles. Surprisingly, glass microspheres formed from such a process may be used in a projection screen that provides acceptable gain, viewing angle, resolution, transmission, ambient light rejection and contrast performance. For purposes of this application, gain is defined as the ratio of the luminance of the screen on axis to the luminance on axis of a Lambertian source having the same integrated light output. Screens having gains as high as 2.25 are believed possible with the present invention.

The glass microspheres constructed according to the present invention combine a desirable index of refraction (preferably, no greater than about 2.1, more preferably, about 1.4 to about 1.9, and most preferably, about 1.5 to about 1.57) and low levels of defects (e.g., bubbles, visible haziness, frostiness, or opacity, and especially substantially nonspherical shapes) upon being reformed (i.e., "as produced" without subsequent sorting to pick out the defects). The bulk, initial recycled glass may be provided with a refractive index within a preselected range.

Preferably, a population of microspheres as produced has less than about 15% defects. More preferably, after sorting, the glass microspheres, as produced, have less than about 5 percent facet defects, and it is believed that the present invention makes it possible to reform recycled glass to provide glass microspheres, as produced, having substantially no cullet.

The process of the present invention is believed to reduce other defects such as bubbles and opaque particles. With the present invention, after sorting, the glass microspheres, as produced, may have less than about 5 percent defects. The terms "microsphere," "bead," and "spherical" are used herein for rounded, substantially unitary glass elements, which may not be perfect spheres.

Preferably, the glass microspheres are visibly transparent (e.g., they transmit a sufficient amount of light such that they are suitable for use in beaded rear projection screen displays). Microspheres that are suitable for use in displays are preferably less than about 150 $\mu$m in diameter.

In one aspect, the present invention comprises method of making a projection screen, preferably a rear projection screen. The method comprises the steps of providing recycled glass, feeding the recycled glass to a reforming furnace flame, reforming the recycled glass into microspheres with the reforming furnace flame, removing glass microspheres outside a preselected range, providing a substrate having an opaque matrix disposed thereon; and applying the glass microspheres to the opaque matrix under conditions effective to produce microspheres in optical contact with the substrate and embedded in the opaque matrix.

The step of providing recycled glass preferably includes the step of providing recycled glass microspheres with a significant number of facet defects. This type of bulk, raw material is believed to be relatively inexpensive and can reduce the overall cost of the projection screen constructed according to the present invention while maintaining acceptable quality performance levels.

Preferably, the step of reforming the recycled glass into microspheres with the reforming furnace flame, further comprises the step of adjusting the reforming furnace flame. More preferably, it includes the step of adjusting the flame stoichiometry sufficient to reform at least some of the recycled glass with facets into microspheres without substantial reboiling or remelting of the recycled glass.

Additional optional steps may be included in the invention including the steps of choosing an acceptable size range for the reformed, recycled glass microspheres, cooling the recycled glass after the recycled glass is formed into glass microspheres, and sorting the cooled microspheres to remove microspheres outside the acceptable size range.

In another aspect, the present invention comprises a projection screen with recycled glass beads constructed according to a reforming process. The projection screen comprises a monolayer of glass microspheres having an average particle diameter of less than about 150 $\mu$m in diameter, wherein the glass microspheres are constructed from recycled glass that has been fed into a reforming furnace flame under conditions sufficient to substantially reduce facets on the recycled glass and to reform the recycled glass into glass microspheres. The screen also includes a substrate, and an opaque matrix positioned such that the microspheres are in optical contact with the substrates and are embedded in the opaque matrix.

The projection screen may be a rear projection screen or a front projection screen with beads having a preselected refractive index and size range.

BRIEF DESCRIPTION OF THE DRAWINGS

The invention may be more completely understood in the following detailed description of various embodiment of the invention in connection with the accompanying drawings, in which.

The invention is amenable to various modifications and alternative forms. Specifics of the invention are shown in the drawings by way of example only. The intention is not to limit the invention to the particular embodiments described. Instead, the intention is to cover all modifications, equivalents, and alternatives falling within the spirit and scope of the invention as defined in the claims.

DETAILED DESCRIPTION

Figure 1:
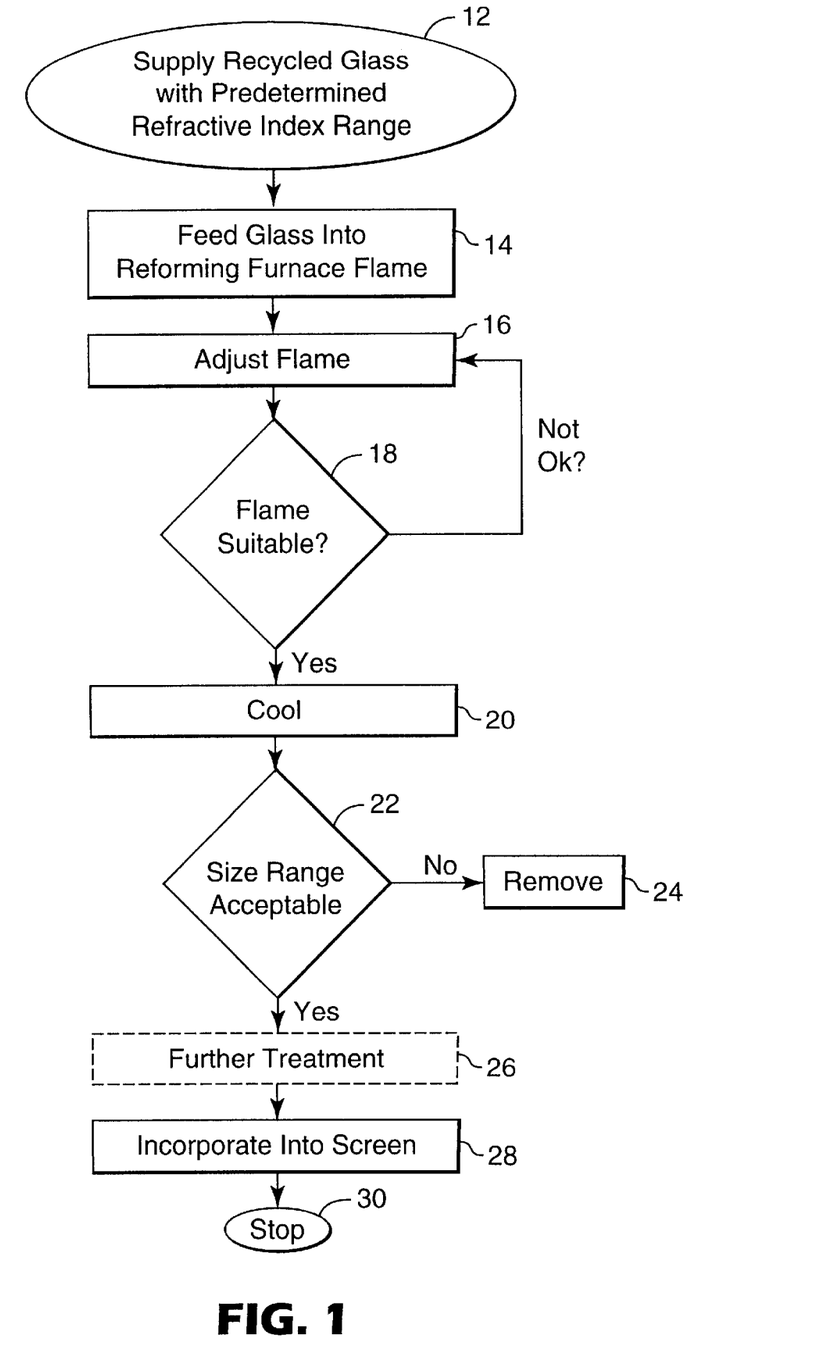
FIG. 1 is a flowchart showing a process according to one aspect of the present invention.

FIG. 1 illustrates a preferred embodiment of a method of making a projection screen according to an aspect of the present invention. The method starts with the step of providing recycled glass 12. Preferably, the recycled glass is provided as inexpensive, recycled glass microspheres in a non-molten state. FIG. 4 illustrates such glass and shows several geometric defects in the bulk glass. It should be noted that any of the steps of the method according to the present invention may be taken in any order, provided that preparation steps essential to another step be undertaken first.

For a monolayer glass beaded screen with glass beads of substantially the same refractive index, the lower the refractive index of the beads, the higher the peak gain. The peak gain of a screen constructed according to the present invention may be between 1.1 and 2.5, more preferably between 1.5 and 1.8, and more preferably about 1.8. The viewing angle is preferably between 20 degrees and 85 degrees, more preferably between 22 and 30 degrees and more preferably about 25 degrees.

Preferably, the desired index of refraction of reformed glass microspheres constructed from the recycled glass could be from about 1.3 to about 2.2, more preferably 1.5 to 1.8 and even more preferably it is about 1.5 to about 1.6. Preferably, the bulk recycled glass has a refractive index within similar preselected ranges. For example, it may be desirable for resultant glass beads to have an average index of between about 1.5 and 1.6, so the refractive index of the recycled glass provided in step 12 may be selected between about 1.50 to about 1.57.

Glass beads with refractive indexes of between 1.6 and 1.8 that are suitable for a rear projection screen are said to be difficult to obtain in an inexpensive fashion. As a result, the present invention is believed to be particularly suitable for use in constructing such glass beads after a source of recycled glass with this refractive index is secured.

The bulk, recycled glass microspheres provided in step 12 are preferably prescreened to a predetermined size range. The resultant glass beads constructed according to the present invention may have an average diameter of greater than about 20 $\mu$m and less than about 400 $\mu$m, more preferably, the average diameter is between greater than about 40 $\mu$m and less than about 90 $\mu$m, more preferably the average diameter is between 50 $\mu$m and about 80 $\mu$m and even more preferably the average diameter is about 65 $\mu$m. The standard deviation of the diameters is preferably less than about 15 $\mu$m. As an example, not intended to be limiting, the bulk, low quality recycled beads provided in step 12 of FIG. 1 have an average size between 40 $\mu$m and 80 $\mu$m with a standard deviation of about 15 $\mu$m.

The glass microspheres resulting from the method of present invention have a desired index of refraction, a relatively low level of defects, and are conveniently reformed at commercially reasonable temperatures (preferably, no greater than about 1960° C.).

The recycled glass is fed into a reforming furnace flame in step 14. A suitable device is described in U.S. Pat. No. 2,334,578 (the entire contents of which are herein incorporated by reference). Alternatively, methane or natural gas flames may be used. The recycled beads are preferably entrained in air but other suitable means could be used to feed the beads to the flame such as hopper feeding, tubes or vibrating members. The low quality recycled glass beads may optionally be preheated to remove moisture that may lead to bubbles.

As an example not intended to be limiting, a methane air burner may be utilized to provide the flame. The flame may be an oxidizing or reducing flame. The defective recycled glass is reformed into microspheres by the reforming furnace flame.

While it is possible that the reforming furnace flame may be preset to provide conditions suitable to reform the recycled glass into microspheres, the method preferably includes step 16 of adjusting the reforming furnace flame. The stoichiometry of the flame may be adjusted in step 18 to accommodate assorted processing needs (e.g., different types of glass). For example, the air/fuel mixture of the flame may be modified to reform the recycled glass. Typically, the temperature of the flame would be between about 1100° C. to about 1960° C.

Preferably, the step of adjusting the reforming furnace flame includes the step of adjusting the flame stoichiometry sufficient to reform the glass into microspheres without substantial reboiling or remelting of the recycled glass. Reboiling of the recycled glass is believed to increase the incidence of bubbles within the resultant glass.

Beads with large bubbles may cause a dark spot in a projection screen. Dark spots tend to increase the graininess of the screen. These bubbles are typically about ⅛ to about ¾ of the size of the bead. The quantity of the large bubbles can be controlled by adjusting the stoichiometry of the flame. Typically, lower air/fuel mixtures tend to reduce the percentages of these large bubbled beads.

The glass is cooled in step 20. Cooling may be accomplished by any suitable methods, such as, for example, cyclone cooling, or quenching.

The formed glass microspheres of undesired size can be screened to assure they are in the proper range of sizes in step 22. The resulting glass microspheres are sorted to remove glass microspheres outside a preselected size range. A number of methods may be utilized to sort the glass microspheres according to size ranges including the use of air classification, mesh screens having a predetermined size, and hydrocyclone methods. Optionally the removed glass may be remelted, and then passed through a flame having a temperature to spheriodize the particles. Alternatively, it may be discarded.

The glass beads may be further treated in optional step 26. For example, the microspheres are preferably washed with water under ambient conditions to remove alkali metal ions from the surface. Subsequently a flow control agent may be applied. Suitable flow control agents include hydrophobic compounds such as VOLAN methacrylato chromic chloride (available from Zaclon Inc., Cleveland, Ohio) and precipitated silicas as described in U.S. Pat. No. 3,177,083 (de Vries). Typically, a flow control agent is coated on the microspheres at a coated weight of at least about 30 parts per million (ppm) and often no greater than about 500 ppm. This reduces the problems encountered in the past with poor flow behavior of compositions that contain such high levels of alkali metal compounds.

Alternatively, the microspheres may be subsequently surface treated with 3M SCOTCHBAN paper protector FC414 fluorochemical (available from 3M Company, St. Paul, Minn.) mixing a solution containing 1.06% of the FC414 fluorochemical in deionized water at a rate of about 16.8 ml/lb of glass microspheres in a screw auger. The auger blends and mixes the solution and microspheres and transports them to a dryer where the mixture is dried.

Figure 5:
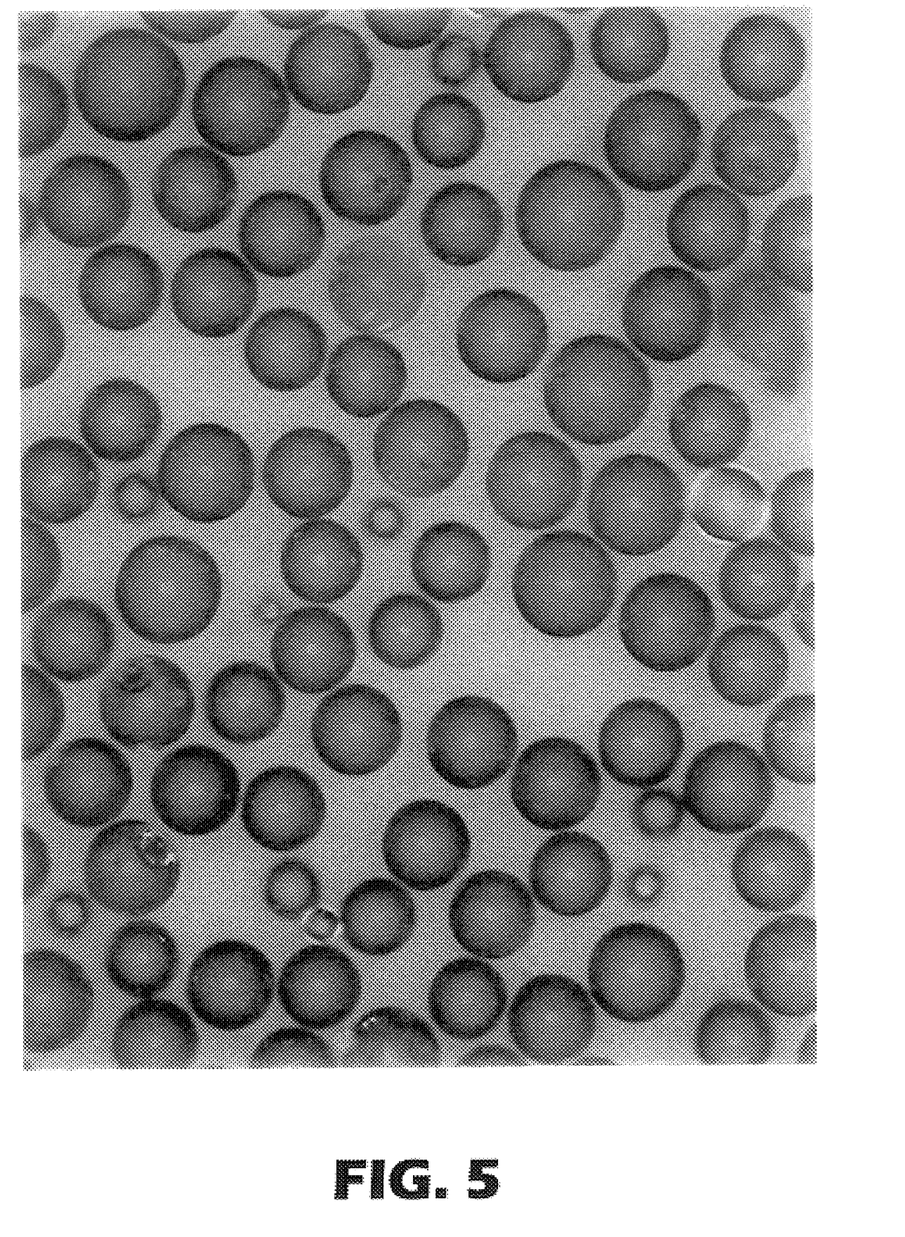
FIG. 5 is a photograph of glass microspheres constructed according to the method of the present invention, which photograph was taken with the aid of a microscope with a magnification of 175X.

FIG. 5 illustrates reformed glass microspheres constructed from recycled glass according to the present invention. The method according to the present invention has substantially reduced the defects in the bead population, especially those due to facets. Surprisingly, a rear projection screen may be constructed by a process that starts with recycled glass beads of initial low quality (e.g. see FIG. 4), which screen nonetheless exhibits acceptable gain, viewing angle, resolution, transmission, ambient light rejection and contrast performance.

To construct a projection screen in step 28, the glass microspheres are applied to an opaque matrix under conditions effective to produce microspheres in optical contact with the substrate and embedded in the opaque matrix. The process ends at step 30.

Preferably, the glass beads in the screen constructed according to the present invention have a refractive index that is substantially uniform at about 1.5, and an average diameter of about 65 $\mu$m with a standard deviation of about 15 $\mu$m. A screen with beads of substantially different sizes or refractive indexes is also contemplated as part of the present invention.

Reforming the recycled glass substantially reduces facet defects and affords glass microspheres with a facet defect level of no greater than about 15%, and preferably, no greater than about 5% as measured via optical microscopy, in a population as produced. By "as produced" it is meant that the microspheres are not sorted to pick out defects (e.g., fibers), although they may be screened to obtain the appropriate size microspheres (such as in step 22).

Bubble defects are also believed to be substantially low in the beads as produced. Although bulk recycled glass with significant bubble defects may affect the defect level "as produced". Preferably the overall defect level (facets, bubbles, etc.) is preferably no greater than about 15%, and preferably, no greater than about 5% as measured via optical microscopy, in a population as produced.

Microspheres of the invention can be incorporated into a projection screen display, such as a rear projection screen display, with excellent transmission and contrast, although other uses are also possible such as a front projection screen. Various embodiments of rear projection screens can incorporate the microspheres produced from recycled glass as described herein.

Figure 2:
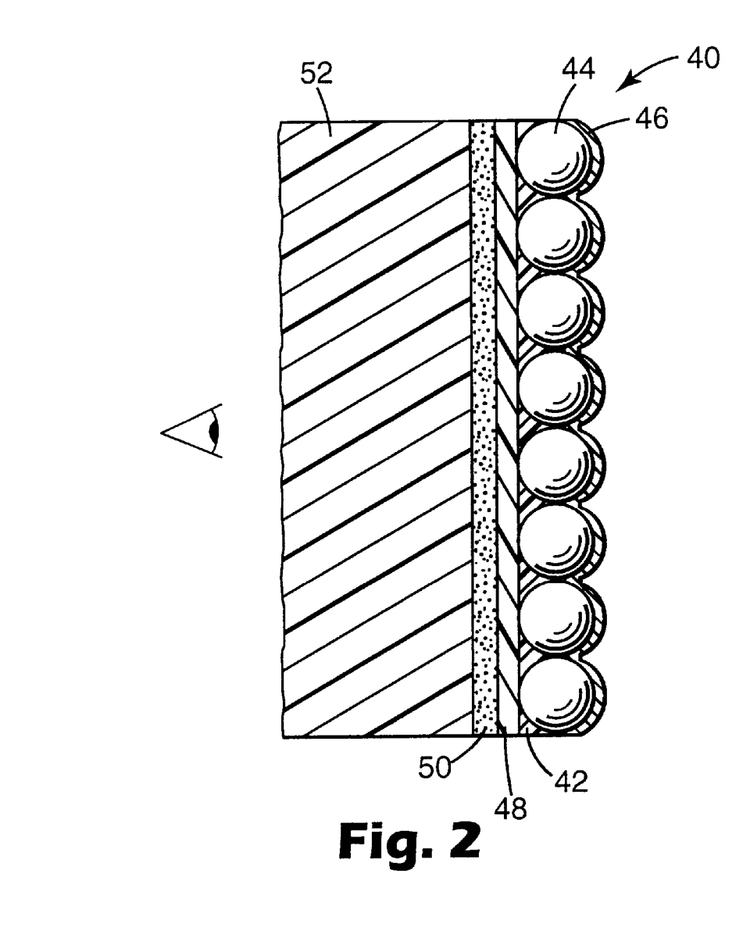
FIG. 2 illustrates one embodiment of a screen containing a monolayer of microspheres according to another aspect of the present invention.

FIG. 2 portrays a schematic side view of an embodiment of a rear projection screen according to the present invention, designated generally as 40. The screen 40 has a front side or viewing side closest to a viewer, and a backside opposite the viewing side. The screen 40 has a plurality of glass beads 44, a light transmitting substrate 48, and a light absorbing layer 42. The glass beads 44 are preferably situated in substantially predetermined positions with the understanding that manufacturing and cost limitations may limit the precision of the placement. For example, the glass beads 44 may be placed in an array, a closely or loosely packed arrangement.

The light absorbing layer 42 may be opaque or substantially opaque. The absorbing layer 42 preferably comprises one or more of a powder coating of carbon black, a black dye, an opaque particle, an organic or inorganic pigment or particle, or such a particle dispersed in a binder material. They may be of a wide variety and shapes. The material may be dispersed in a liquid or solid binder system. In one embodiment, the absorbing layer 42 comprises a clear binder having black particles dispersed therethrough. The binder may comprise, for example, an acrylate or other UV curable polymer. The absorbing layer 42 may be applied by a conventional technique such as a coating process or powder coating.

The beads 44 are preferably in intimate contact with the substrate 48. The substrate 48 may preferably be constructed from suitable light transmitting materials such as polyvinyl chloride, acrylic, polycarbonate or combinations of such materials.

The substrate 48 is preferably substantially transparent or translucent. Suitable transparent substrates include flexible substrates constructed from acrylic. The substrate 48 may have an optional matte anti-glare finish at the exit, preferably achieved by embossing. An optional tint may be provided. It should be noted that even the substrate 48 is optional as it could be removed (e.g., if the beads 44 and layer 42 are self-supporting).

Rear projection screen 40 is placed in a location substantially coincident with projected image surface of a projection apparatus, oriented such that the image formed by projected light is incident on microspheres 44. A viewer then sees, from the front side of the screen, the projected image made visible by rear projection screen 40 after the light emerges through the screen.

The opaque layer 42 (also referred to herein as an opaque matrix or light absorbing layer) could perform a number of functions, including supporting the microspheres, defining the exit aperture of the microspheres, controlling light passing through the interstices between microspheres and controlling ambient light. Ideally, the opacity of the material forming this opaque matrix is high in order to eliminate specular transmission of light through the intersticial areas and to absorb ambient light.

The opaque matrix may be made from a wide variety of materials. The choice of material preferably produces suitable adhesive bonding to the glass microspheres 44. Preferably, the opaque matrix 42 is able to be coated on the surface of substrate 48, for example, and held in a softened state until microspheres can be placed on the coating and pressed into contact with the surface. A preferred material is an acrylate loaded with carbon black to make it opaque. Various thermoplastic or thermoset, particularly, thermal or UV-curable, polymers can be used. The light absorbing layer 42 or opaque matrix may be applied using a variety of techniques, such as, but not limited to, casting, extruding, coating, spraying, laminating and screen printing.

The screen 40 can include several optional features including elements 50, 52 and 46. For example, the screen 40 may have an optional optical diffuser 50. Polymeric materials such as polymethylmethacrylate and polyethylene terephthalate (PET), and polycarbonate have been found suitable. While polymeric materials have the advantage of lightweight and flexibility, glass may also be used.

Alternatively, element 50 may comprise an adhesive applied, for example, by lamination. Non-limiting examples of adhesives include pressure sensitive adhesives, hot melt or heat activated adhesives that are pressure sensitive at the time of application such as pressure sensitive adhesives disclosed in U.S. Pat. Nos. 4,994,332; 4,968,562, 5,141,790; 5,296,277; 5,362,516, and 6,197,397, EP Publication Nos. 570 515, and 617 708; and PCT WO 97/01610 (all incorporated by reference). Adhesives that are believed to be suitable for some embodiments are disclosed in Satas et al., *Handbook of Pressure Sensitive Adhesives,* 2nd E$^d$, (Von Nostrand Reinhold, N.Y. 1989) (the entire contents of which are herein incorporated by reference).

As another alternative, optional layers 50 and 52 may comprise any of the layers or elements disclosed in commonly assigned patent applications PCT WO 99/50710 and PCT WO 98/45753; and U.S. patent application Nos. 09/560,267 filed Apr. 26, 2000 entitled "Rear Projection System With Reduced Speckle"; and 09/717,598 filed Nov. 21, 2000 entitled "Optical System with Reduced Color Shift" (the entire contents of each of which are herein incorporated by reference).

A cover layer 46 covering the microspheres and the opaque matrix may optionally be used in the screens of the present invention. The cover layer 46 may be formed from any suitable transparent material, such as a polymer, sol-gel coating, and the like. Advantages provided by the cover layer 46 include protecting the microspheres, supporting the microspheres in the film, and an improved diffuse light transmission. Alternatively, the cover layer 46 for screen 40 may comprise a performance enhancing coating such as those described in U.S. patent application Nos. 09/560,267 filed Apr. 11, 2000 entitled "Rear Projection System With Reduced Speckle"; and 09/717,598 filed Nov. 21, 2000 entitled "Optical System with Reduced Color Shift" (the entire contents of each of which are herein incorporated by reference).

Figure 3:
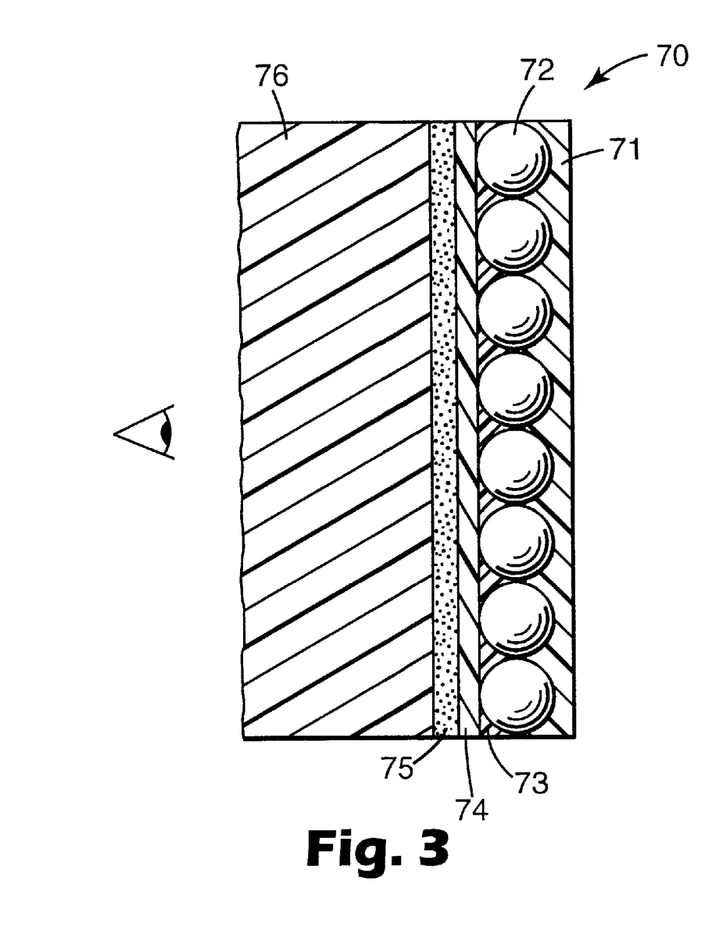
FIG. 3 illustrates another embodiment of screen according to the present invention.

FIG. 3 illustrates another embodiment of projection screen 70 according to the present invention. The screen 70 includes a monolayer of glass microsphere beads 72, an opaque portion 73, and a transparent substrate 74.

The screen 70 may optionally include a cover layer 71, or a diffuser 75 or other optional element 76. The cover layer 71 may provide a flat outer surface upon which additional layers can be disposed, or it may conform to the surface topology of the microspheres with the effect that the radius of curvature of the microspheres is reduced.

To construct a screen, the opaque material is applied onto the substrate. The opaque material may be applied as a liquid coating, such as a polymeric material dissolved in a suitable solvent system. Alternatively, it may be extruded onto the substrate as a melted thermoplastic resin. After the microspheres have been pressed into place, the drying of the opaque material may be completed. Preferably, prior to application, the microspheres are treated with a fluorochemical compound as disclosed in U.S. Pat. No. 3,222,204 (Weber).

If the opaque material is applied by extrusion of a heated thermoplastic resin, the microspheres can be applied to the opaque material, which can then be heated to its softening temperature prior to pressing microspheres into place. The microspheres may be pressed into place by passing through a presser, such as a pair of rolls, that presses the microspheres into opaque layer. The opaque layer should be sufficiently soft to allow microspheres to be pressed into opaque layer and into contact with the surface of the substrate. The process should form optically transparent apertures, without requiring an amount of force that would cause damage to microspheres or the substrate.

A bead applicator may be used to coat the substrate with the microspheres. This use of such a bead applicator is described in U.S. Pat. No. 6,204,971 (the entire contents of which are herein incorporated by reference).

The complete disclosures of all patents, patent documents, and publications, are incorporated herein by reference as if individually incorporated. In the above description, the position of elements has sometimes been described in terms of "lower", "rear", "outer" and "front". These terms have been used merely to simplify the description of the various elements of the invention, such as those illustrated in the drawings. They should not be understood to place any limitations on the useful orientation of the elements of the present invention. Accordingly, the present invention should not be considered limited to the particular examples described above, but rather should be understood to cover all aspects of the invention as fairly set out in the claims. For example, it should be noted that other screen elements may be used with the present invention including those that use significant refraction to achieve a desired viewing angle. For example, the optical system may include a beaded screen according to the present invention combined with a fresnel lens and/or a lenticular lens or sheet as described in or constructed in accordance with U.S. Pat. Nos. 3,712,707; 3,872,032; 4,379,617; 4,418,986; 4,468,092; 4,509,823; 4,576,850 and 5,183,597 (the entire contents of which are herein incorporated by reference).

Various modifications, equivalents, as well as numerous structures to which the present invention may be applicable will be readily apparent to those of skill in the art to which the present invention is directed upon review of the present specification. The claims are intended to cover such modifications and devices.

What is claimed is:

1. A method of making a projection screen, the method comprising the steps of:

providing glass including soda lime glass, feeding the glass to a heat source, reforming the glass into microspheres with heat source, sorting the reformed glass microspheres to remove glass microspheres outside a preselected size range, providing a substrate with an associated light absorbing portion; and applying the glass microspheres to the light absorbing portion under conditions effective to produce microspheres in optical contact with the substrate and embedded in the light absorbing portion.

2. The method of claim 1 wherein the glass microspheres have an average index of refraction of between about 1.50 to about 1.57.

3. The method of claim 1 wherein the heat source comprises a furnace flame and the process further comprises the step of adjusting the furnace flame.

4. The method of claim 3 wherein the step of adjusting the furnace flame includes the step of adjusting the flame stoichiometry sufficient to reform at least some of the glass with facets into microspheres without substantial reboiling or remelting of the recycled glass.

5. The method of claim 1 wherein the step of providing recycled glass includes the step of providing glass with a refractive index within a preselected range.

6. The method of claim 1 further including the steps of:
choosing an acceptable size range for the reformed glass microspheres,
cooling the reformed, glass after the glass is reformed into glass microspheres, and
then sorting the cooled microspheres to remove microspheres outside the acceptable size range.

7. The method of claim 6 wherein, after sorting, the glass microspheres, as produced, have less than about 5 percent that exhibit facet defects.

8. The method of claim 6 wherein, after sorting, the glass microspheres, as produced, have less than about 5 percent defects.

9. The method of claim 6 wherein the step of providing recycled glass includes the step of providing glass microspheres with a significant number of facet defects.

10. The method of claim 1 wherein the process further comprises the step of reforming the glass to form glass microspheres, as produced, having substantially no cullet for facets.

11. A projection screen comprising:
a monolayer of glass microspheres having an average particle diameter of less than about 150 $\mu$m in diameter, wherein the glass microspheres are constructed from glass including soda lime glass that has been fed into a reforming furnace flame under conditions sufficient to substantially reduce facets on the glass and to reform at least some of the glass into glass microspheres,
a substrate, and
an opaque matrix positioned such that a substantial portion of the micro spheres are in optical contact with the substrate and are embedded in the opaque matrix.

12. A projection screen according to claim 11 wherein the projection screen comprises a rear projection screen, and the glass beads have an average refractive index of about 1.5.

13. A projection screen according to claim 11 wherein the projection screen comprises a rear projection screen, at least some of the glass beads have a refractive index between about 1.6 and about 1.8.

14. A projection screen according to claim 11 wherein the glass beads have an average diameter of greater than about 35 $\mu$m and less than about 150 $\mu$m.

15. A projection screen according to claim 11 wherein the screen exhibits substantially no sparkle.

* * * * *